(12) United States Patent
Takagi et al.

(10) Patent No.: US 11,232,893 B2
(45) Date of Patent: Jan. 25, 2022

(54) MAGNET STACK AND MOTOR

(71) Applicant: TDK Corporation, Tokyo (JP)

(72) Inventors: Nobuo Takagi, Tokyo (JP); Motohisa Murata, Tokyo (JP)

(73) Assignee: TDK Corporation, Tokyo (JP)

( * ) Notice: Subject to any disclaimer, the term of this patent is extended or adjusted under 35 U.S.C. 154(b) by 446 days.

(21) Appl. No.: 15/912,702

(22) Filed: Mar. 6, 2018

(65) Prior Publication Data
US 2018/0261367 A1 Sep. 13, 2018

(30) Foreign Application Priority Data
Mar. 8, 2017 (JP) .............................. JP2017-044289

(51) Int. Cl.
*H01F 7/02* (2006.01)
*H02K 1/26* (2006.01)
*H02K 1/27* (2006.01)
*H02K 21/16* (2006.01)

(52) U.S. Cl.
CPC ............ *H01F 7/021* (2013.01); *H02K 1/265* (2013.01); *H02K 1/2766* (2013.01); *H02K 21/16* (2013.01); *H02K 2213/03* (2013.01)

(58) Field of Classification Search
CPC ................................ H01F 7/021; H02K 1/265
USPC ........................................................ 335/306
See application file for complete search history.

(56) References Cited

U.S. PATENT DOCUMENTS

| 4,265,754 A * | 5/1981 | Menold ................... C02F 1/482 |
| | | 204/664 |
| 5,356,534 A * | 10/1994 | Zimmerman ........... B03C 1/023 |
| | | 123/538 |
| 9,093,218 B2 * | 7/2015 | Ozeki .................. H01F 41/0266 |
| 2001/0043020 A1 * | 11/2001 | Nishiyama .............. B60L 15/20 |
| | | 310/156.01 |
| 2002/0041128 A1 | 4/2002 | Nishiyama et al. |
| 2008/0204174 A1 * | 8/2008 | Ito ...................... H01L 21/67144 |
| | | 335/222 |
| 2014/0054999 A1 | 2/2014 | Fulton et al. |
| 2015/0097642 A1 * | 4/2015 | Takagi ................ H01F 41/0293 |
| | | 335/306 |
| 2019/0131065 A1 * | 5/2019 | Jia .......................... B32B 15/043 |

FOREIGN PATENT DOCUMENTS

| JP | 2000-245085 A | 9/2000 |
| JP | 2000-324736 A | 11/2000 |
| JP | 2002-136006 A | 5/2002 |

(Continued)

*Primary Examiner* — Alexander Talpalatski
(74) *Attorney, Agent, or Firm* — Faegre Drinker Biddle & Reath LLP

(57) ABSTRACT

In a magnet stack, an eddy current channel is cut off by an insulating layer in an insulating region of facing surface regions of the pair of magnets. Meanwhile, in a conducting region of the facing surface region of the pair of magnets, electrons can move between the pair of magnets via a conductor, and heat can be exchanged between the pair of magnets by the movement of electrons. Therefore, in the magnet stack, by cutting off the eddy current channel in the insulating region of the facing surface region of the pair of magnets, the degradation in magnet performance is suppressed and the cooling efficiency of the magnet is enhanced in the conducting region.

16 Claims, 10 Drawing Sheets

(56) References Cited

FOREIGN PATENT DOCUMENTS

| | | | |
|---|---|---|---|
| JP | 2006-136130 | A | 5/2006 |
| JP | 2009-142091 | A | 6/2009 |
| JP | 2010-011579 | A | 1/2010 |

\* cited by examiner

Fig.5A P0
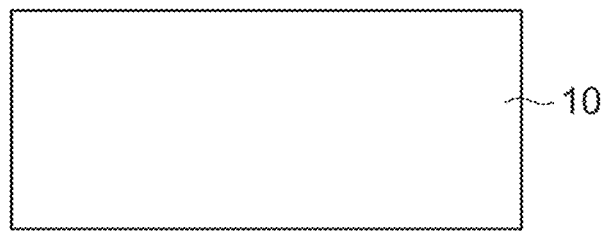
Fig.5B P1
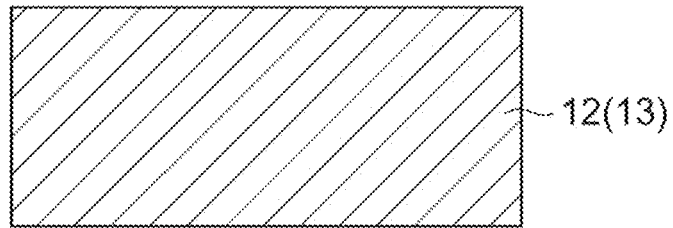

*Fig.7A* P6
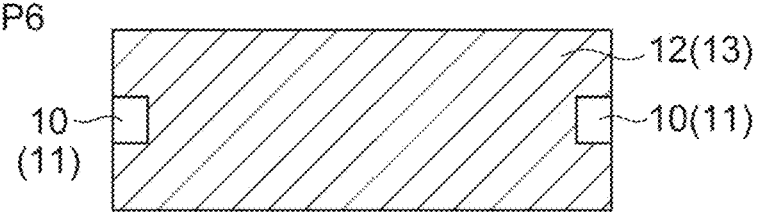
*Fig.7B* P7
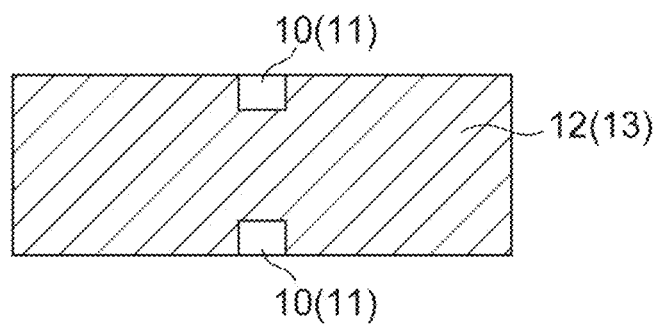
*Fig.7C* P8
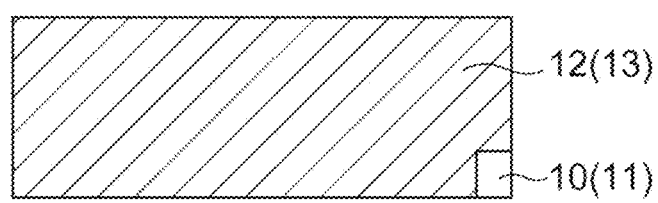
*Fig.7D* P9
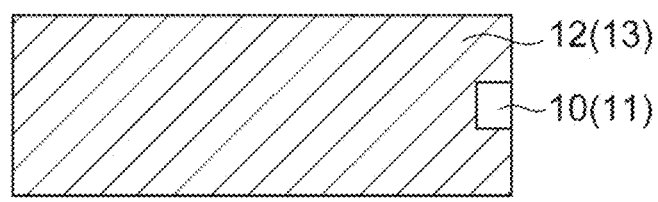
*Fig.7E* P10
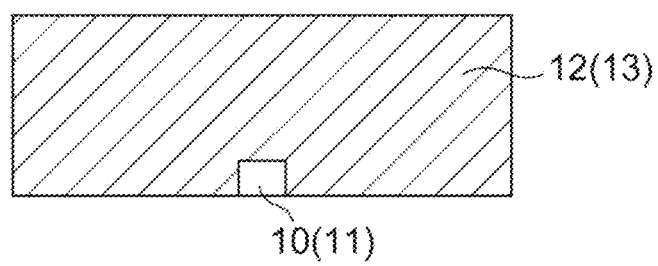
*Fig.7F* P11
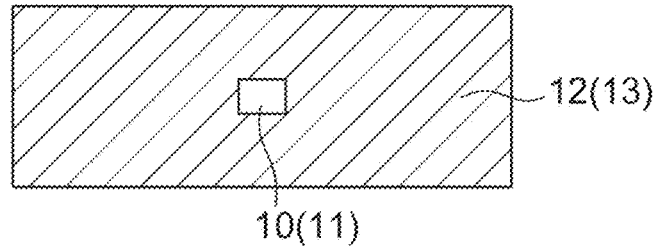

MAGNET STACK AND MOTOR

CROSS-REFERENCE TO RELATED APPLICATIONS

This application is based upon and claims the benefit of priority from Japanese Patent Application No. 2017-044289, filed on 8 Mar. 2017, the entire content of which is incorporated herein by reference.

TECHNICAL FIELD

The present disclosure relates to a magnet stack and a motor.

BACKGROUND

Conventionally, as a permanent magnet motor used in a hybrid car, a hard disk drive or the like, a magnet embedded type motor (IPM motor) in which a permanent magnet is embedded in a rotor has been known (for example, Japanese Unexamined Patent Publication No. 2009-142091 (Patent Literature 1)). Further, Japanese Unexamined Patent Publication No. 2000-324736 (Patent Literature 2) discloses a magnet embedded type motor in which a permanent magnet embedded in a rotor is divided into a plurality of small magnets, an insulator is interposed between the small magnets, and a channel of an eddy current between the small magnets is cut off, thereby suppressing degradation in magnet performance due to an eddy current.

SUMMARY

However, in the above-mentioned related art, the insulator interposed between the small magnets cuts off the thermal channel together with the eddy current channel (that is, the electrical channel) between the small magnets. That is, the insulator interposed between the small magnets hinders the transfer of heat between the small magnets, thereby making it difficult to sufficiently increase the cooling efficiency of the small magnets.

According to the present disclosure, there is provided a magnet stack and a motor in which cooling efficiency is improved, while suppressing degradation in magnet performance.

A magnet stack according to an aspect of the present disclosure has a plurality of stacked magnets, the plurality of magnets including a first magnet and a second magnet adjacent to each other in a stacking direction, wherein a part of a facing surface region is a conducting region and a remainder of the facing surface region is an insulating region, the first magnet and the second magnet facing each other in the facing surface region, the first magnet and the second magnet being conductive in the conducting region, the first magnet and the second magnet being insulated in the insulating region.

In the magnet stack, the eddy current channel is cut off in the insulating region of the facing surface region in which the first magnet and the second magnet face each other. Meanwhile, in the conducting region of the facing surface region, electrons can move between the first magnet and the second magnet, and heat can be exchanged between the first magnet and the second magnet by the movement of electrons. Therefore, in the magnet stack, by cutting off the eddy current channel in the insulating region of the facing surface region of the first magnet and the second magnet, the degradation in magnet performance is suppressed and the cooling efficiency of the magnet is enhanced in the conducting region.

In the magnet stack according to another aspect, only one conducting region may exist in the facing surface region.

In the magnet stack according to another aspect, the conducting region may have a shape which surrounds the facing surface region at a circumference of the facing surface region.

In the magnet stack according to another aspect, the conducting region may exist at an edge of the facing surface region.

In the magnet stack according to another aspect, the conducting region may exist at the center of the facing surface region.

In the magnet stack according to another aspect, a plurality of the conducting regions may exist in the facing surface region.

In the magnet stack according to another aspect, the facing surface region may have a rectangular shape, and the conducting region may exist on facing edges of the facing surface region, respectively.

In the magnet stack according to another aspect, the first magnet and the second magnet may be conductive by a conductor interposed between the first magnet and the second magnet in the conducting region.

In the magnet stack according to another aspect, the first magnet and the second magnet may be in contact with each other in the conducting region so that the first magnet and the second magnet are conductive with each other.

In the magnet stack according to another aspect, the first magnet and the second magnet may be insulated from each other by an insulator interposed between the first magnet and the second magnet in the insulating region.

According to another aspect of the present disclosure, there is provided a motor including a rotor provided with a slot housing a magnet stack, wherein the magnet stack has a plurality of stacked magnets, the plurality of magnets including a first magnet and a second magnet adjacent to each other in a stacking direction, a part of a facing surface region is a conducting region and a remainder of the facing surface region is an insulating region, the first magnet and the second magnet facing each other in the facing surface region, the first magnet and the second magnet being conductive in the conducting region, the first magnet and the second magnet being insulated from each other in the insulating region.

In the magnet stack of the motor, the eddy current channel is cut off in the insulating region of the facing surface region in which the first magnet and the second magnet face each other. Meanwhile, in the conducting region of the facing surface region, electrons can move between the first magnet and the second magnet, and heat can be exchanged between the first magnet and the second magnet by movement of electrons. Therefore, in the motor, by cutting off the eddy current channel in the insulating region of the facing surface region of the first magnet and the second magnet, the degradation in magnet performance is suppressed and the cooling efficiency of the magnet is enhanced in the conducting region.

BRIEF DESCRIPTION OF THE DRAWINGS

FIGS. 5A and 5B are diagrams illustrating each sample used for the experiment.

FIGS. 7A to 7F are diagrams illustrating each sample used for the experiment.

DETAILED DESCRIPTION

Figure 1:
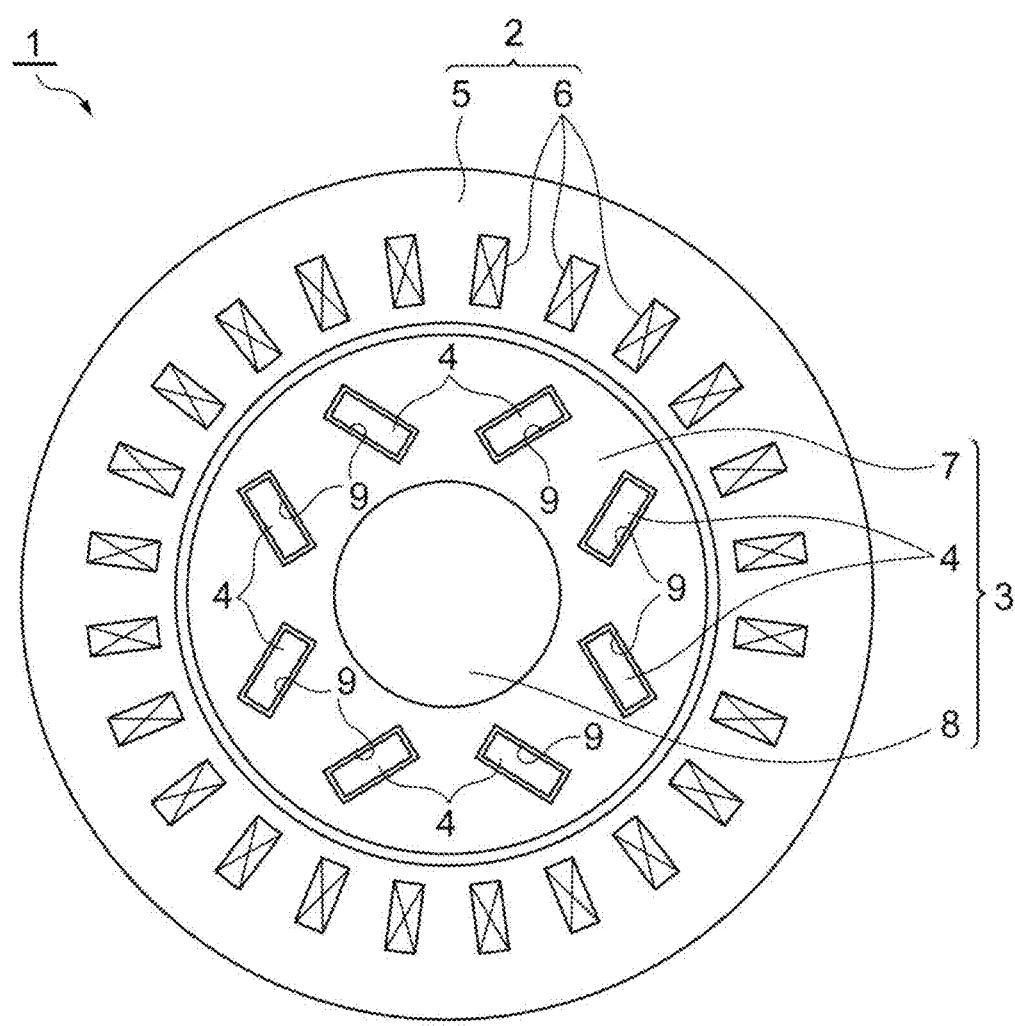
FIG. 1 is a schematic plan view illustrating a motor according to the embodiment.

Hereinafter, a mode for carrying out the present disclosure will be described in detail with reference to the accompanying drawings. The same or equivalent elements are denoted by the same reference numerals, and if the description is repeated, the description thereof will not be provided.

First, a configuration of a motor 1 according to the embodiment will be described with reference to FIG. 1.

As illustrated in FIG. 1, the motor 1 is configured to include a stator 2, and a rotor 3 disposed inside the stator 2 in a freely rotatable manner. The motor 1 is a so-called magnet-embedded type IPM motor in which a magnet stack 4 is embedded in the rotor 3.

The stator 2 includes an iron core 5 and a plurality of windings 6 wound around the iron core 5. Further, a predetermined number of windings 6 are disposed on the inner circumferential surface of the stator 2 at equal intervals, and when the windings 6 are energized, a rotating magnetic field for rotating the rotor 3 is generated.

The rotor 3 includes a core 7, a shaft 8 connected to the core 7, and a magnet stack 4 housed and fixed in a slot 9 provided in the core 7.

Figure 2:
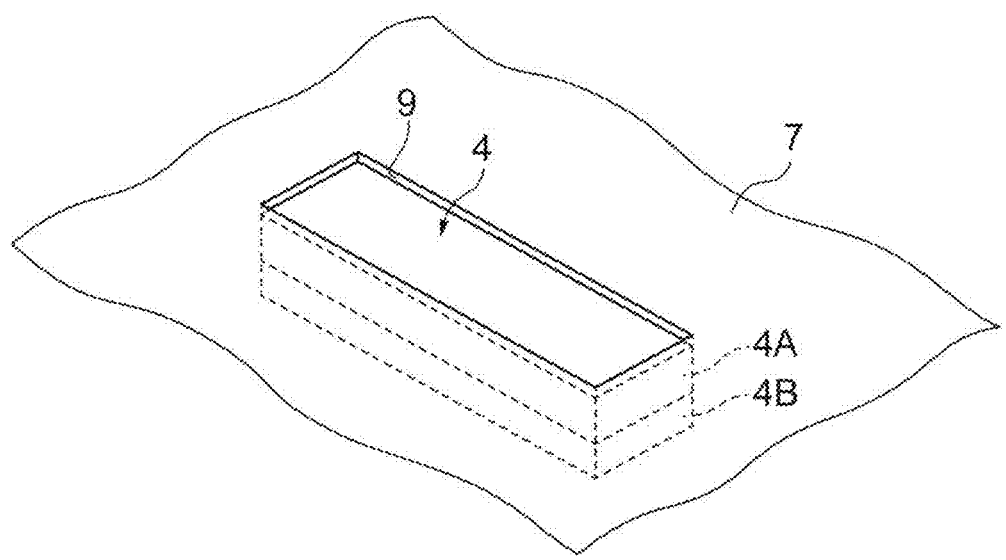
FIG. 2 is an enlarged perspective view illustrating the circumference of a slot in FIG. 1.

The core 7 is made up of a stack such as a thin plate-like electromagnetic steel plate, a shaft hole is formed in a central portion thereof, and the shaft 8 is fitted to the shaft hole. In the vicinity of the outer circumference of the core 7, a plurality of pairs (four pairs in FIG. 1) of the slots 9 periodically arranged around the axis of the core 7 is provided. Each pair of slots 9 is disposed symmetrically with respect to an imaginary line extending from the axis of the core 7 and is disposed to be inclined with respect to the imaginary line by a predetermined angle. As illustrated in FIG. 2, the magnet stack 4 is housed in each slot 9.

As illustrated in FIG. 2, the magnet stack 4 includes a pair of rectangular flat plate-like magnets 4A and 4B stacked along the depth direction of the slots 9. The pair of magnets 4A and 4B are permanent magnets made of the same material. The magnets 4A and 4B according to the present embodiment are made of a rare earth sintered magnet, for example, an R-T-B based sintered magnet. The R-T-B based sintered magnet includes grains (crystal grains) having an $R_2T_{14}B$-type crystal structure and grain boundaries.

R in the R-T-B based sintered magnet represents at least one kind of rare earth elements. The rare earth elements refer to Sc, Y and lanthanoid element belonging to the third group of the long period type periodic table. Examples of the lanthanoid element include, for example, La, Ce, Pr, Nd, Sm, Eu, Gd, Tb, Dy, Ho, Er, Tm, Yb, Lu and the like. T in the R-T-B based sintered magnet represents Fe, or Fe and Co. Further, T may contain one or more kinds selected from other transition metal elements. B in the R-T-B based sintered magnet represents boron (B), or boron (B) and carbon (C).

The R-T-B based sintered magnet according to the present embodiment may contain Cu, Al, or the like. By adding these elements, it is possible to increase the coercive force, to increase the corrosion resistance, or to improve the temperature characteristics.

Furthermore, the R-T-B based sintered magnet according to the present embodiment may contain Dy, Tb, or both as heavy rare earth elements. The heavy rare earth element may be contained in crystal grains and the grain boundaries. In the case where the heavy rare earth element is substantially not contained in the crystal grains, the heavy rare earth element may be contained in the grain boundaries. The concentration of the heavy rare earth element in the grain boundaries may be higher than the concentration in the crystal grain. The R-T-B based sintered magnet according to the present embodiment may be an R-T-B based sintered magnet in which the grain boundary diffusion of the heavy rare earth elements is performed. In the R-T-B based sintered magnet in which the grain boundary diffusion of the heavy rare earth element is performed, it is possible to improve residual magnetic flux density and coercive force by a smaller amount of heavy rare earth element than the R-T-B based sintered magnet in which the grain boundary diffusion is not performed.

Further, the dimensions of the pair of magnets 4A and 4B are designed to be the same dimension. For example, the long-side length is in the range of 3 to 70 mm, the short-side length is in the range of 3 to 70 mm, and the height is in the range of 3 to 70 mm. In the present embodiment, each of the pair of magnets 4A and 4B has a long-side length of 60.0 mm, a short-side length of 8.0 mm, and a height of 5.0 mm. Also, an insulating layer 13 and a conductor 11 to be described later are interposed between the pair of magnets 4A and 4B, and the interval between the magnets 4A and 4B is in the range of 5 to 500 μm, for example, 15 μm.

Further, in the large magnets used for wind power generation and the like, for example, the long-side length is in the range of 30 to 100 mm, the short-side length is in the range of 30 to 100 mm, and the height is in the range of 30 to 100 mm. The insulating layer 13 and the conductor 11 to be described later are interposed between the pair of magnets 4A and 4B, and the interval between the magnets 4A and 4B is in the range of 0.1 to 1 mm.

Regarding the stack of the magnet stack 4, the magnets 4A and 4B already divided to the above dimensions may be superimposed on each other, and the magnets 4A and 4B may be divided into the above dimensions after being superposed on each other in the form of a large-sized magnet plate to obtain the magnet stack 4. In the stacking method of dividing after superimposing in the state of a magnet plate, a cutting tool such as a dicer can be used at the time of division. If necessary, a predetermined polishing treatment (for example, barrel polishing or the like) may be performed on the magnets 4A and 4B to chamfer the magnets 4A and 4B.

Figure 3:
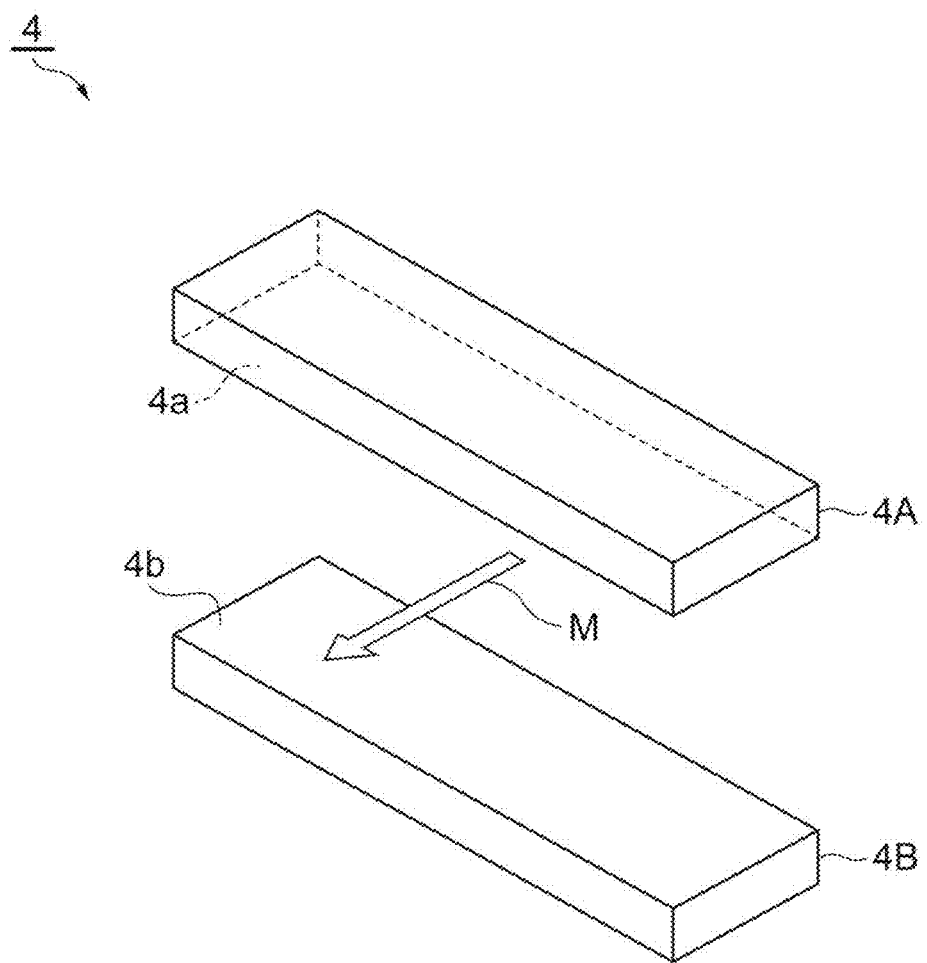
FIG. 3 is a perspective view illustrating a stacked state of the magnet stack illustrated in FIGS. 1 and 2.

As illustrated in FIG. 3, the pair of magnets 4A and 4B are stacked such that a lower surface 4a of the magnet (first magnet) 4A located on the upper side and an upper surface 4b of the magnet (second magnet) 4B located on the lower side face each other at the same attitude. The pair of magnets 4A and 4B are magnetized in the same direction, and in the present embodiment, the pair of magnets 4A and 4B are magnetized in the direction M parallel to the short-side direction.

The cavity dimension of the slot 9 is substantially the same as the dimension of the magnet stack 4 or larger than the dimension of the magnet stack 4. However, the depth of the slot 9 is designed to be slightly deeper (for example, deeper by 0.2 mm) than the height of the magnet stack 4 so that the upper surface of the magnet stack 4 is not extracted from the slot 9. Further, the width of the slot 9 is designed so that a predetermined clearance (e.g., 0.1 mm) is provided between the inner surface of the slot 9 and the side surface of the magnet stack 4.

Further, the slots 9 may be filled with a filler as appropriate to fix the magnet stack 4 to the slots 9. As the filler, thermosetting resin can be used, and for example, an epoxy resin or a silicone resin can be used. However, as long as the magnet stack 4 housed in the slot 9 is in a state of being fixed to the slot 9, it is not necessarily required to use a filler.

Subsequently, a conducting region and an insulating region in a rectangular region (hereinafter also referred to as "facing surface region"), in which the lower surface 4a of the magnet 4A and the upper surface 4b of the magnet 4B of the magnet stack 4 face each other, will be described with reference to FIGS. 4, 5A, 5B, 6A to 6D, and 7A to 7F.

Figure 4:
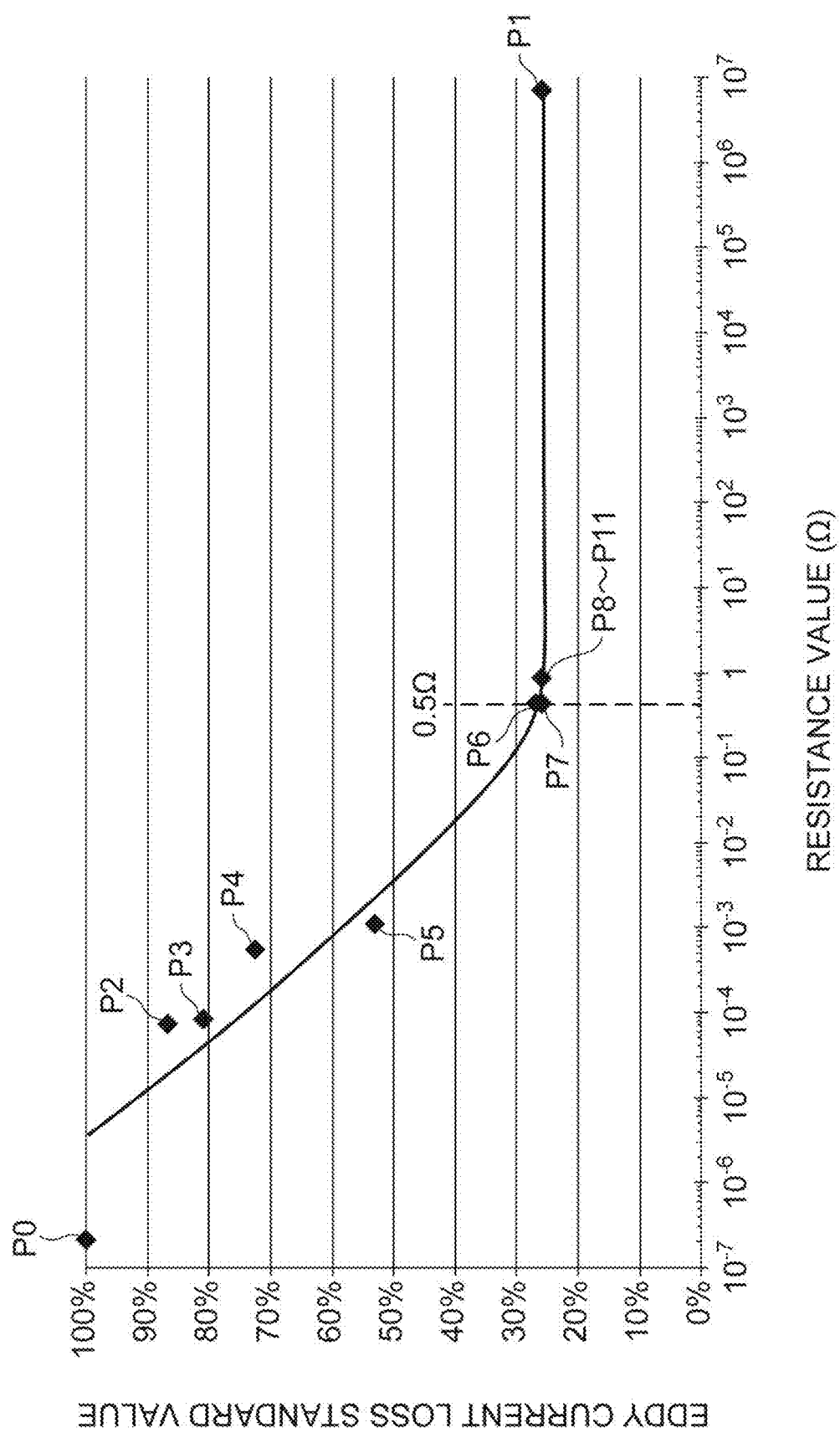
FIG. 4 is a graph illustrating experimental results concerning eddy current loss of the magnet stack illustrated in FIG. 3 and resistance value between magnets.

The inventors prepared samples P1 to P11 in which patterns of the conducting regions and the insulating regions of the facing surface region of a pair of magnets 4A and 4B are different, and measured the resistance value between the magnets 4A and 4B with respect to each sample. The measurement result is as illustrated in the graph of FIG. 4. In the graph of FIG. 4, a horizontal axis (logarithmic scale) represents a resistance value ($\Omega$) between the magnets 4A and 4B, and a vertical axis represents the eddy current loss with the eddy current loss of the sample P0 as a reference (100%). For measurement of the resistance value between the magnets 4A and 4B, an ohmmeter (RM 3548) manufactured by Hioki Electric Co., Ltd. was used. Current of 0.2 mA, 1000 Hz was used, a high-frequency core loss measuring device (MTR-2617) manufactured by Metron Technical Co., Ltd. and an analysis software (Maxwell) manufactured by ANSYS Co., Ltd. was used for measurement of eddy current loss, an alternating magnetic field was continuously applied to the magnet, and eddy current loss was calculated from the amount of heat generated by the magnet.

Here, the conduction/insulation pattern and the resistance value in each sample will be described.

FIG. 5A is a diagram illustrating a conduction/insulation pattern in the facing surface region of the sample P0. As illustrated in FIG. 5A, the entire region of the facing surface region of the sample P0 is a conducting region 10. Specifically, in the sample P0, the lower surface 4a of the magnet 4A and the upper surface 4b of the magnet 4B are in direct contact with each other over the entire region of the facing surface region. The resistance value between the magnets 4A and 4B in the sample P0 was $2.25 \times 10^{-7} \Omega$.

FIG. 5B is a diagram illustrating a conduction/insulation pattern in the facing surface region of the sample P1. As illustrated in FIG. 5B, the entire region of the facing surface region of the sample P1 is an insulating region 12. Specifically, the insulating layer 13 is provided in the insulating region 12 of the facing surface region of the sample P1, and the insulating layer 13 allows the lower surface 4a of the magnet 4A and the upper surface 4b of the magnet 4B to be electrically insulated over the entire region of the facing surface region. The insulating layer 13 is made of an insulating resin, and is made of, for example, an epoxy resin, a polyamide imide resin, a polyamide resin, a polyimide resin, an acrylic resin, or the like. The resistance value between the magnets 4A and 4B in the sample P1 was $1.00 \times 10^{7} \Omega$.

Figure 6A:
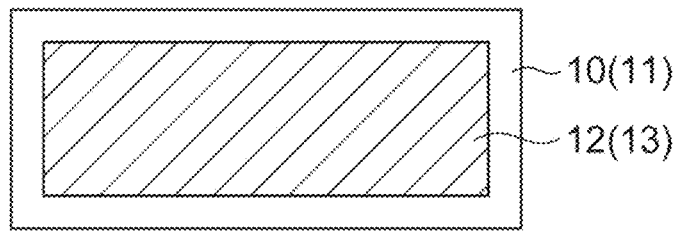
FIGS. 6A to 6D are diagrams illustrating each sample used for the experiment.
Figure 8:
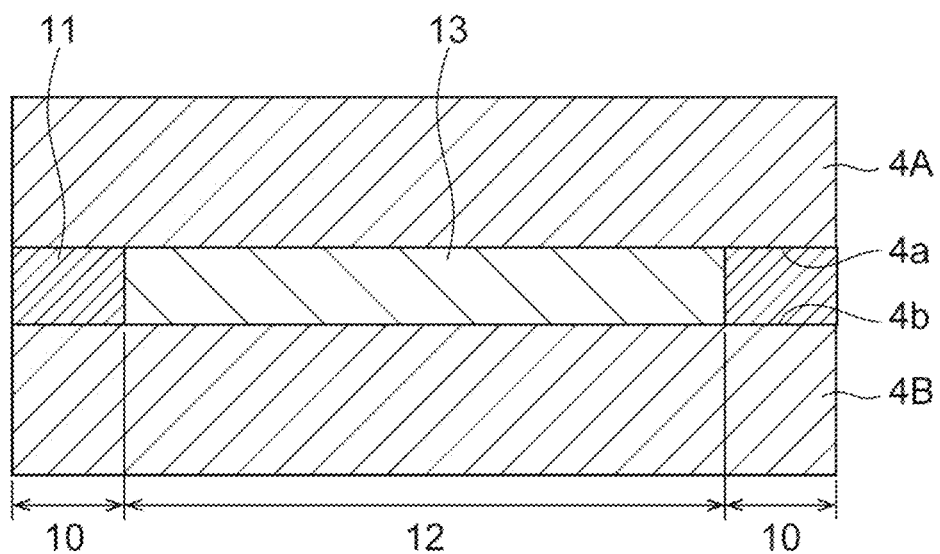
FIG. 8 is a cross-sectional view illustrating a conductor and an insulating layer interposed between the magnets of the magnet stack.

FIG. 6A is a diagram illustrating the conduction/insulation pattern in the facing surface region of the sample P2. As illustrated in FIG. 6A, in the facing surface region of the sample P2, the conducting region 10 is a rectangular annular (width 10 μm) surrounding the facing surface region at the circumference of the facing surface region, and the inner region of the conducting region 10 is the insulating region 12. Specifically, as illustrated in FIG. 8, the conductor 11 is provided in the conducting region 10 of the facing surface region of the sample P2, and the insulating layer 13 is provided in the insulating region 12. Therefore, in the sample P2, the magnet 4A and the magnet 4B are conductive in the conducting region 10 via the conductor 11 provided in the conducting region 10. The conductor 11 is made of a material having conductivity, and is made of, for example, the same material (rare earth sintered magnet in this embodiment) as the magnets 4A and 4B, a metallic material, an alloy material, or the like. The resistance value between the magnets 4A and 4B in the sample P2 was $7.88 \times 10^{-5} \Omega$.

Figure 6B:
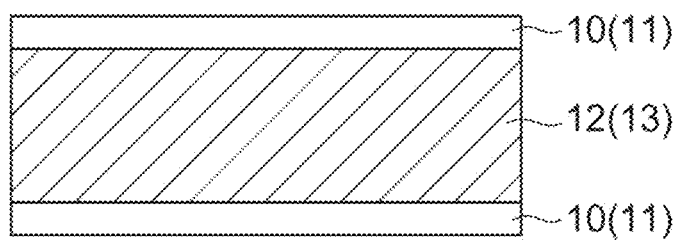

FIG. 6B is a diagram illustrating a conduction/insulation pattern in the facing surface region of the sample P3. As illustrated in FIG. 6B, in the facing surface region of the sample P3, two strip-like (55.5 mm×10 μm) conducting regions 10 exist on the entire edges of the long side of the facing surface region, and the conductor 11 is provided in each conducting region 10. Further, in the facing surface region of the sample P3, the inner region of both the conducting regions 10 is the insulating region 12, and the insulating layer 13 is provided in the insulating region 12. The resistance value between the magnets 4A and 4B in the sample P3 was $9.01 \times 10^{-5} \Omega$.

Figure 6C:
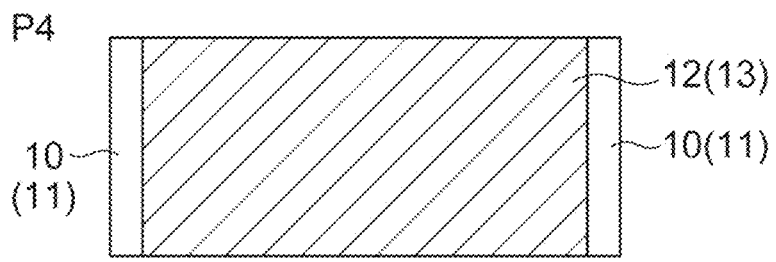

FIG. 6C is a diagram illustrating a conduction/insulation pattern in the facing surface region of the sample P4. As illustrated in FIG. 6C, in the facing surface region of the sample P4, two strip-like (10 μm×8 mm) conducting regions 10 exist on the entire edges of the short side of the facing surface region, and the conductor 11 is provided in each conducting region 10. Further, in the facing surface region of the sample P4, the inner region of both conducting regions 10 is the insulating region 12, and the insulating layer 13 is provided in the insulating region 12. The resistance value between the magnets 4A and 4B in the sample P4 was $6.25 \times 10^{4} \Omega$.

Figure 6D:
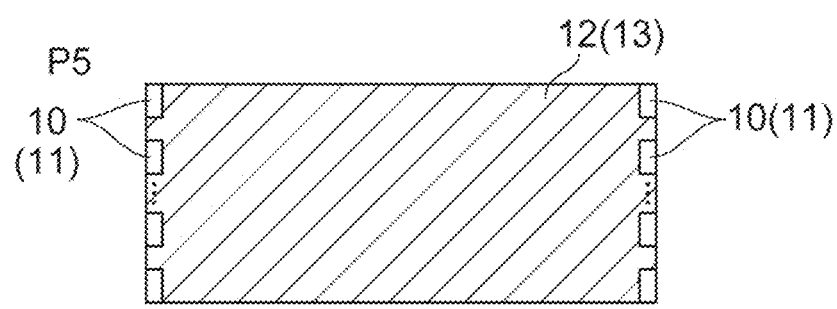

FIG. 6D is a diagram illustrating a conduction/insulation pattern in the facing surface region of the sample P5. As illustrated in FIG. 6D, in the facing surface region of the sample P5, a large number of conducting regions 10 is periodically arranged on the short side of the facing surface region, and the conductor 11 is provided in each conducting region 10. The length of the conducting region 10 in the long-side direction is 30 μm, the length in the short-side direction is 10 μm, and the spaced distance between adjacent conducting regions 10 in the short-side direction is 30 μm. In the facing surface region of the sample P5, the remainder region of the conducting region 10 is the insulating region 12, and the insulating layer 13 is provided in the insulating region 12. The resistance value between the magnets 4A and 4B in the sample P5 was $1.25 \times 10^{-3} \Omega$.

FIG. 7A is a diagram illustrating a conduction/insulation pattern in the facing surface region of the sample P6. As illustrated in FIG. 7A, in the facing surface region of the sample P6, two rectangular (10×10 μm) conducting regions 10 exist at the center of the short side of the facing surface region one by one, and the conductor 11 is provided in each conducting region 10. The conducting region 10 on one short side and the conducting region 10 on the other short side are located at positions corresponding to each other, and are arranged in the long-side direction. Further, in the facing surface region of the sample P6, the remainder region of the conducting region 10 is the insulating region 12, and the insulating layer 13 is provided in the insulating region 12. The resistance value between the magnets 4A and 4B in the sample P6 was 0.5Ω.

FIG. 7B is a diagram illustrating a conduction/insulation pattern in the facing surface region of the sample P7. As illustrated in FIG. 7B, in the facing surface region of the sample P7, two rectangular (10 μm×10 μm) conducting regions 10 exist at the center of the long side of the facing surface region one by one, and the conductor 11 is provided in each conducting region 10. The conducting region 10 on one long side and the conducting region 10 on the other long side are located at the positions corresponding to each other, and are arranged in the short-side direction. Further, in the facing surface region of the sample P7, the remainder region of the conducting region 10 is the insulating region 12, and the insulating layer 13 is provided in the insulating region 12. The resistance value between the magnets 4A and 4B in the sample P7 was 0.5Ω.

FIG. 7C is a diagram illustrating a conduction/insulation pattern in the facing surface region of the sample P8. As illustrated in FIG. 7C, in the facing surface region of the sample P8, one rectangular (10×10 μm) conducting region 10 exists at the corner of the facing surface region, and the conductor 11 is provided in the conducting region 10. Further, in the facing surface region of the sample P8, the remainder region of the conducting region 10 is the insulating region 12, and the insulating layer 13 is provided in the insulating region 12. The resistance value between the magnets 4A and 4B in the sample P8 was 1Ω.

FIG. 7D is a diagram illustrating a conduction/insulation pattern in the facing surface region of the sample P9. As illustrated in FIG. 7D, in the facing surface region of the sample P9, one rectangular (10 μm×10 μm) conducting region 10 exists at the center of one short side of the facing surface region, and the conductor 11 is provided in the conducting region 10. Further, in the facing surface region of the sample P9, the remainder region of the conducting region 10 is the insulating region 12, and the insulating layer 13 is provided in the insulating region 12. The resistance value between the magnets 4A and 4B in the sample P9 was 1Ω.

FIG. 7E is a diagram illustrating a conduction/insulation pattern in the facing surface region of the sample P10. As illustrated in FIG. 7E, in the facing surface region of the sample P10, one rectangular (10 μm×10 μm) conducting region 10 is located at the center of one long side of the facing surface region, and the conductor 11 is provided in the conducting region 10. Further, in the facing surface region of the sample P10, the remainder region of the conducting region 10 is the insulating region 12, and the insulating layer 13 is provided in the insulating region 12. The resistance value between the magnets 4A and 4B in the sample P10 was 1Ω.

FIG. 7F is a diagram illustrating a conduction/insulation pattern in the facing surface region of the sample P11. As illustrated in FIG. 7F, in the facing surface region of the sample P11, one rectangular (10 μm×10 μm) conducting region 10 exists at the center of the facing surface region, and the conductor 11 is provided in the conducting region 10. Further, in the facing surface region of the sample P11, the remainder region of the conducting region 10 is the insulating region 12, and the insulating layer 13 is provided in the insulating region 12. The resistance value between the magnets 4A and 4B in the sample P11 was 1Ω.

Further, as illustrated in the graph of FIG. 4, the eddy current loss of each of the samples P1 to P11 was smaller than the eddy current loss of the sample P0. That is, it was found that the eddy current loss is suppressed in the samples P1 to P11 having the insulating region 12 in the facing surface region, as compared with the sample P0 having no insulating region 12 in the facing surface region. That is, by providing the insulating region 12 in at least a part of the facing surface region of the magnets 4A and 4B as in the samples P1 to P11, the eddy current loss can be suppressed.

However, regarding the sample P1 among the samples P1 to P11 including the insulating region 12, the insulating layer 13 is provided as the insulating region 12 over the entire region of the facing surface region, and the electrons cannot move between the magnets 4A and 4B, and the heat transfer between the magnets 4A and 4B due to movement of electrons is hindered. Therefore, in the sample P1, it is difficult to sufficiently enhance the cooling efficiency of the magnet stack 4.

The inventors have found from the experimental results that, by setting a part of the facing surface region as the conducting region 10 and the remainder as the insulating region 12 like the samples P2 to P11, rather than setting the entire region of the facing surface region as the conducting region 10 like the sample P0 or setting the entire region of the facing surface region as the insulating region 12 like the sample P1, the cooling efficiency of the magnet stack 4 is enhanced, while suppressing the eddy current loss.

That is, in the magnet stack 4 having the conduction/insulation pattern such as the samples P2 to P11 described above, the eddy current channel is cut off by the insulating layer 13 in the insulating region 12 of the facing surface region of the magnets 4A and 4B. On the other hand, electrons can move between the magnet 4A and the magnet 4B via the conductor 11 in the conducting region 10 of the facing surface region of the magnets 4A and 4B, and heat can be exchanged between the magnets 4A and 4B by movement of electrons. Therefore, in the magnet stack 4, by cutting off the eddy current channel in the insulating region 12 of the facing surface region of the magnets 4A and 4B, the degradation in magnet performance is suppressed, and the cooling efficiency of the magnet is enhanced in the conducting region 10.

Further, from the experimental results illustrated in FIG. 4, it was found that the eddy current loss is suppressed in samples P6 to P11 to the same extent as in sample P1. Specifically, the eddy current loss of the samples P6 to P11 is suppressed to about 26% with respect to the eddy current loss of the sample P0. From this fact, the inventors have found that, by reducing the area of the conducting region 10 provided in the facing surface region to a certain extent, similarly to the case where the conducting region 10 is not provided in the facing surface region, there is a remarkable effect of suppressing the eddy current loss. More specifically, it has been found that, by designing the conduction/insulation pattern (in particular, the area of the conducting region) such that the resistance value between the magnets 4A and 4B is 0.5Ω or more as in the samples P6 to P11, the eddy current loss can be remarkably suppressed. That is, while a part of the facing surface region between the magnets 4A and 4B is set as the conducting region 10 as in the samples P6 to P11, by designing the conducting region 10 such that the resistance value between the magnets 4A and 4B becomes 0.5Ω or more, it is possible to suppress the eddy current loss to the same extent as in the case where the entire region of the facing surface region is set as the insulating region.

Further, the rectangular annular conducting region 10 illustrated in FIG. 6A or the strip-like region illustrated in FIGS. 6B and 6C are not necessarily required to be conductive over the entire circumference/entire length, and one location or a plurality of locations may be missed to form the insulating region.

The conducting region 10 of the facing surface region is not necessarily conductive via the conductor 11 but may be conductive by the direct contact between the lower surface 4a of the magnet 4A and the upper surface 4b of the magnet 4B. Specifically, when the lower surface 4a of the magnet 4A and the upper surface 4b of the magnet 4B are not perfectly parallel but are slightly inclined, the lower surface 4a of the magnet 4A and the upper surface 4b of the magnet 4B are in direct contact with each other, and the conducting region 10 is formed in the contact portion. For example, when the magnet stack 4 is housed in the slot 9 of the motor 1, the aforementioned inclination can occur. Further, when thickness unevenness occurs in the insulating layer 13, a region in which the insulating layer 13 does not exist occurs in a part of the formation region of the insulating layer 13 (that is, the insulating region 12), and this region may be the conducting region 10. Furthermore, even when the surface roughness of at least one of the lower surface 4a of the magnet 4A and the upper surface 4b of the magnet 4B is large (for example, the surface roughness (Rmax) is about 1 to 10 μm), thickness unevenness occurs in the insulating layer 13, a region in which the insulating layer 13 does not exist occurs in a part of the formation region of the insulating layer 13, and this region may become the conducting region 10.

As the conductor 11, as an example, fragments of the same constituent material as the magnets 4A and 4B can be adopted. The fragments may be detached from the edges at the time of polishing or when the magnets 4A and 4B receive vibrations or impacts, and the fragments may be the conductor 11. As described above, when the magnet stack 4 is divided into pieces, a predetermined cutting tool is used. However, a part thereof enters between the lower surface 4a of the magnet 4A and the upper surface 4b of the magnet 4B as a foreign matter, and may be the conductor 11.

Further, it is not always necessary to provide the insulating layer 13 in the insulating region 12 of the facing surface region, and there may be depletion (depletion layer) in which there is nothing between the lower surface 4a of the magnet 4A and the upper surface 4b of the magnet 4B. Even in this case, the insulation between the magnets 4A and 4B in the insulating region 12 is achieved.

Figure 9:
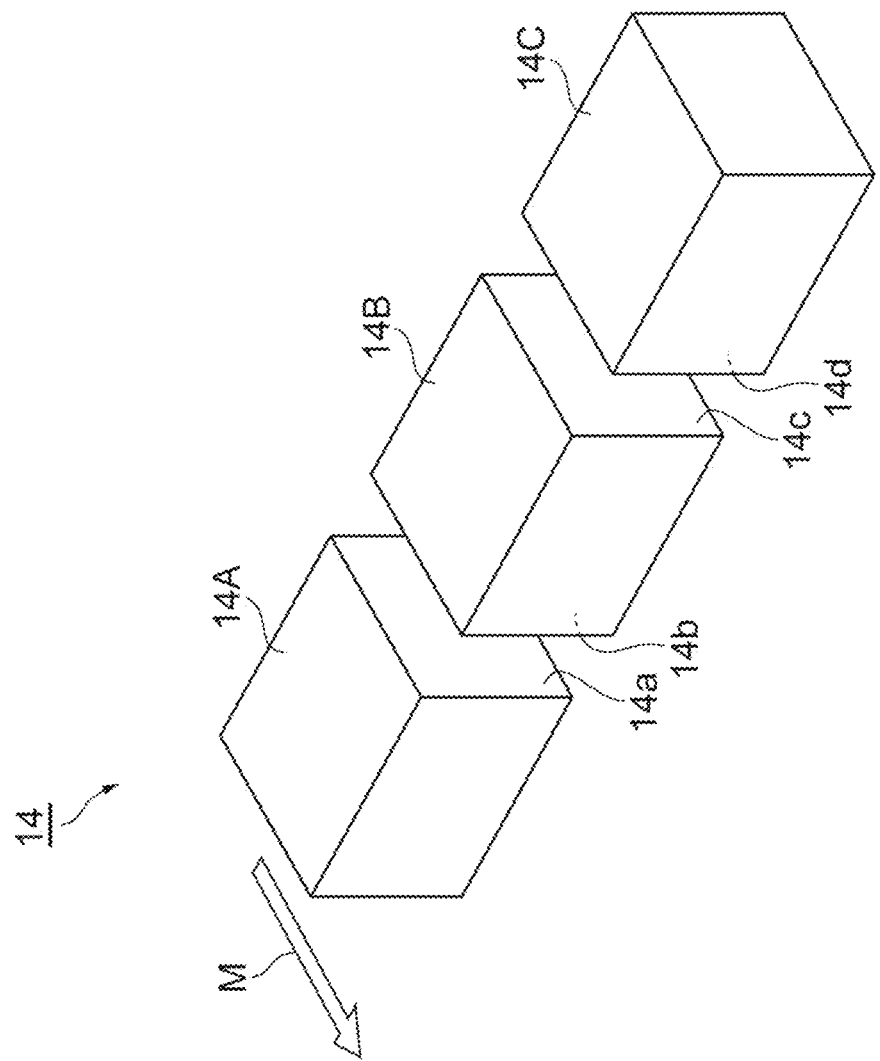
FIG. 9 is a perspective view illustrating a magnet stack of a different embodiment.

The magnet stack can be a magnet stack 14 illustrated in FIG. 9 instead of the aforementioned magnet stack 4.

The magnet stack 14 illustrated in FIG. 9 is different from the magnet stack 4 in the division manner. That is, in the magnet stack 14, magnets 14A, 14B, and 14C are divided by the plane parallel to the magnetization direction M. In this case, in the facing surface region between a surface 14a of the magnet 14A facing the magnet 14B and a surface 14b of the magnet 14B facing the magnet 14A, and in the facing surface region between a surface 14c of the magnet 14B facing the magnet 14C and a surface 14d of the magnet 14C facing the magnet 14B, by setting a part of the region to the aforementioned conducting region 10 and the remaining part as the insulating region 12, the same or the similar effect as that of the magnet stack 4 described above can be obtained.

Figure 10:
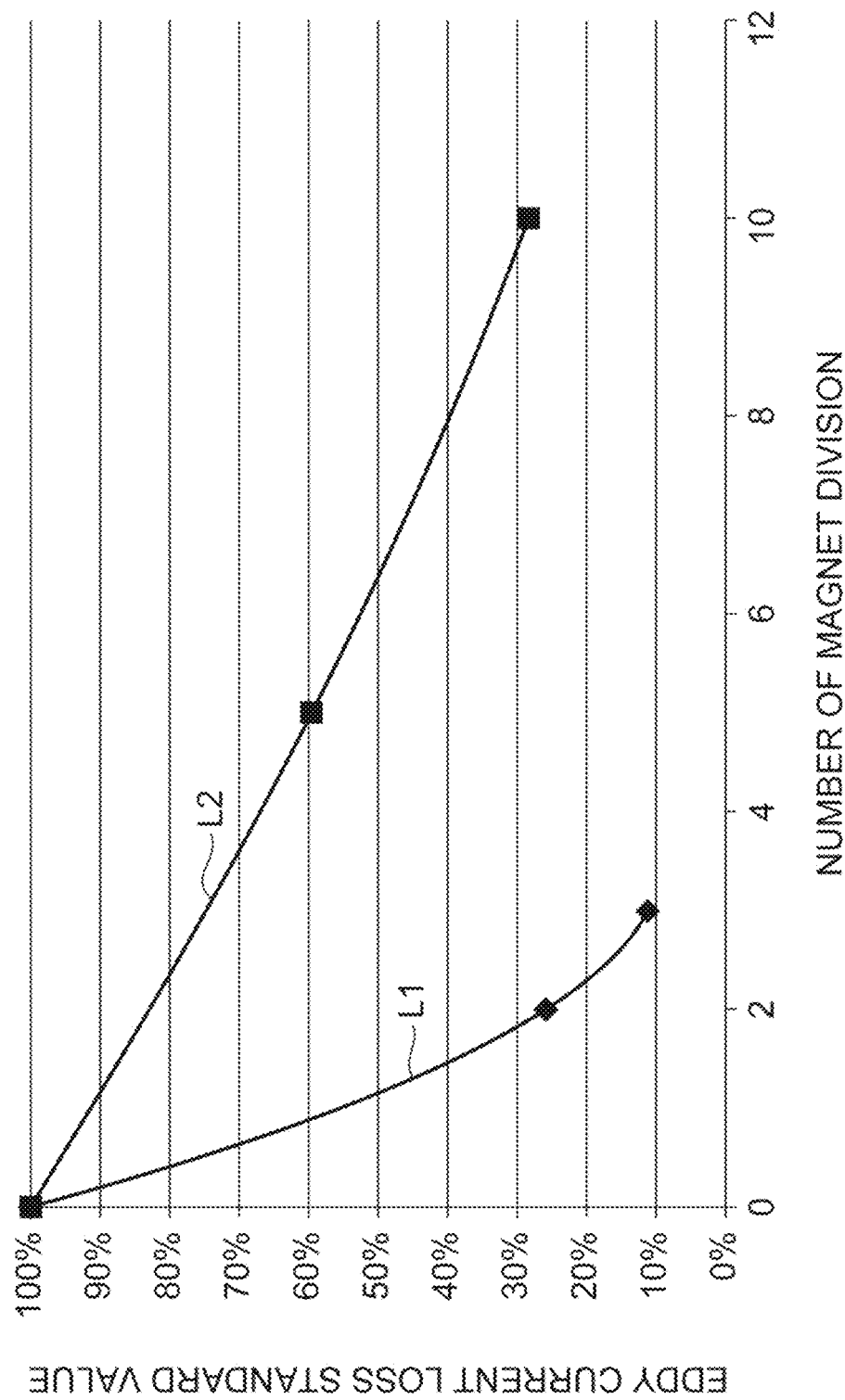
FIG. 10 is a graph illustrating a relation between the eddy current loss of the magnet stack and the number of magnet division.

The graph of FIG. 10 illustrates a relation between the eddy current loss of the magnet stack and the number of magnet division obtained by the experiments conducted by the inventors. In the graph of FIG. 10, L1 represents a division manner (vertical division) of the magnet stack 4, and L2 represents a division manner (horizontal division) of the magnet stack 14. From the graph of FIG. 10, it can be seen that eddy current loss decreases for both L1 and L2 as the division number increases. Further, since the decrease in eddy current loss when divided into two by the vertical division L1 is about the same as the decrease in eddy current loss when divided into ten by the horizontal division L2, it is found that the effect of eddy current loss reduction due to increase in the number of division is greater in the case of L1.

Therefore, the eddy current loss can be reduced more efficiently in the division manner of the magnet stack 4 illustrated in FIG. 3 than in the division manner of the magnet stack 14 illustrated in FIG. 9.

The present disclosure is not limited to the above embodiment, and various modifications are possible without departing from the gist of the invention.

For example, the number of slots provided in the motor can be appropriately increased or decreased, and the positional relation of the slots can also be appropriately changed. Further, the number of magnets (that is, the number of divisions) constituting the magnet stack can be appropriately increased or decreased. In the case where the magnet stack includes three or more magnets, in the facing surface regions of the two magnets adjacent to each other in the stacking direction of the plurality of magnets, by setting a part thereof as the conducting region and the remainder as the insulating region, the same or similar effects as those of the aforementioned magnet stack 4 can be obtained.

What is claimed is:

1. A magnet stack having a plurality of stacked magnets, the plurality of magnets including a first magnet and a second magnet adjacent to each other in a stacking direction, the first magnet and the second magnet are rare earth sintered magnets,
    wherein a part of a facing surface region is a conducting region and a remainder of the facing surface region is an insulating region, the first magnet and the second magnet facing each other in the facing surface region, the first magnet and the second magnet being conductive in the conducting region, the first magnet and the second magnet are electrically connected by a conductor interposed between the first magnet and the second magnet, the conductor is made of the same constituent material as the first and second magnets, the conductor is a detached piece from the first and second magnets, the first magnet and the second magnet being insulated by the insulating region, and the whole conductor is located entirely between the first magnet and the second magnet without protruding from the first magnet and the second magnet.

2. The magnet stack according to claim 1, wherein only one conducting region exists in the facing surface region.

3. The magnet stack according to claim 2, wherein the conducting region has a shape that surrounds the facing surface region at a circumference of the facing surface region.

4. The magnet stack according to claim 2, wherein the conducting region exists at an edge of the facing surface region.

5. The magnet stack according to claim 2, wherein the conducting region exists at the center of the facing surface region.

6. The magnet stack according to claim 1, wherein a plurality of the conducting regions exist in the facing surface region.

7. The magnet stack according to claim 6, wherein the facing surface region has a rectangular shape, and the conducting region exists on facing edges of the facing surface region, respectively.

8. The magnet stack according to claim 1, wherein the first magnet and the second magnet are insulated from each other by an insulator interposed between the first magnet and the second magnet in the insulating region.

9. The magnet stack according to claim 2, wherein the first magnet and the second magnet are insulated from each other by an insulator interposed between the first magnet and the second magnet in the insulating region.

10. A motor comprising a rotor provided with a slot housing a magnet stack,
wherein the magnet stack has a plurality of stacked magnets, the plurality of magnets including a first magnet and a second magnet adjacent to each other in a stacking direction, the first magnet and the second magnet are rare earth sintered magnets,
a part of a facing surface region is a conducting region and a remainder of the facing surface region is an insulating region, the first magnet and the second magnet facing each other in the facing surface region, the first magnet and the second magnet being conductive in the conducting region, the first magnet and the second magnet are electrically connected by a conductor interposed between the first magnet and the second magnet, the conductor is made of the same constituent material as the first and second magnets, the conductor is a detached piece from the first and second magnets, the first magnet and the second magnet being insulated from each other by the insulating region, and the whole conductor is located entirely between the first magnet and the second magnet without protruding from the first magnet and the second magnet.

11. The motor according to claim 10, wherein the first magnet and the second magnet are insulated from each other by an insulator interposed between the first magnet and the second magnet in the insulating region.

12. The magnet stack according to claim 2, wherein the conducting region exists at a center of the edge of the facing surface region.

13. The motor according to claim 10, wherein only one conducting region exists in the facing surface region.

14. The motor according to claim 13, wherein the conducting region exists at a center of a edge of the facing surface region.

15. The magnet stack according to claim 1, a resistance value between the first magnet and the second magnet is 0.5Ω or more.

16. The motor according to claim 10, a resistance value between the first magnet and the second magnet is 0.5Ω or more.

* * * * *